US010262299B2

(12) United States Patent
Li et al.

(10) Patent No.: US 10,262,299 B2
(45) Date of Patent: Apr. 16, 2019

(54) EFFICIENT RECOMMENDATION SERVICES

(71) Applicant: LinkedIn Corporation, Sunnyvale, CA (US)

(72) Inventors: Yi Li, San Jose, CA (US); Victor Chen, Foster City, CA (US); Krishnaram Kenthapadi, Sunnyvale, CA (US); Ganesh Venkataraman, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 170 days.

(21) Appl. No.: 15/433,741

(22) Filed: Feb. 15, 2017

(65) Prior Publication Data
US 2018/0232700 A1    Aug. 16, 2018

(51) Int. Cl.
*G06Q 50/00*    (2012.01)
*G06Q 10/10*    (2012.01)
*G06N 99/00*    (2019.01)

(52) U.S. Cl.
CPC ....... *G06Q 10/1053* (2013.01); *G06N 99/005* (2013.01); *G06Q 50/01* (2013.01)

(58) Field of Classification Search
USPC ......................................................... 705/321
See application file for complete search history.

(56) References Cited

U.S. PATENT DOCUMENTS

| 7,472,097 | B1 * | 12/2008 | Scarborough | ........ G06N 3/0454 706/26 |
| 8,909,564 | B1 * | 12/2014 | Kaplow | ............... G06N 99/005 706/12 |
| 2015/0127565 | A1 * | 5/2015 | Chevalier | .............. G06Q 10/00 705/319 |
| 2015/0235143 | A1 * | 8/2015 | Eder | ..................... G16H 50/50 706/12 |
| 2017/0323268 | A1 * | 11/2017 | Zhang | ................. G06F 17/3053 |

OTHER PUBLICATIONS

Gu, Yupeng, et al., "Learning Global Term Weights for Content-based Recommender Systems", WWW, (2016), 391-400.
Miao, Xu, et al., "Distributed Personalization", KDD'15, (2015), 1989-1998.
Zhang, Xianxing, et al., "GLMix: Generalized Linear Mixed Models for Large-Scale Response Prediction", KDD '16, (2106), 10 pgs.

* cited by examiner

*Primary Examiner* — Andrew B Whitaker
(74) *Attorney, Agent, or Firm* — Schwegman Lundberg & Woessner, P.A.

(57) ABSTRACT

The disclosed subject matter involves identifying clusters and segments of a population of data for use in a recommendation service. Clusters of members or items are formed, where the clusters, or partitions are close to being equal in size, items are distributed based on similarities identified with matrix factorization. A matrix used in the matrix factorization is customized based on the recommendation type. The items are formed into clusters based on the similarities and the clusters are used in training of a generalized linear mixed model treating the clusters as random-level effects. The trained model may be used in the recommendation service. Other embodiments are described and claimed.

20 Claims, 12 Drawing Sheets

| | QUERY MEMBERID = 1234 ~203 | 1ST-NEAREST MEMBERID = 2345 ~205 | 2ND-NEAREST MEMBERID = 1342 ~207 | 3RD-NEAREST MEMBERID = 3124 ~209 |
|---|---|---|---|---|
| ~201 SOFTWARE ENGINEERING MACHINE LEARNING | | | | |
| 2 JOBS THE MEMBER VIEWED/APPLIED | LEAD DATA SCIENTIST MACHINE LEARNING 211 ~ 215 COMPANY A | DATA SCIENTIST, MARKETING CLOUD PLATFORM COMPANY B ~217 | DATA SCIENTIST INTERN COMPANY C | ANDROID APPLICATIONS ENGINEER COMPANY D |
| | SOFTWARE ENGINEER MACHINE LEARNING 213 ~ COMPANY E | SENIOR STAFF DATA SCIENTIST COMPANY F | MACHINE LEARNING ENGINEER COMPANY G | ENGINEER, MACHINE LEARNING ENGINEER COMPANY H |

*FIG. 2*

| | QUERY JOB | 1ST-NEAREST JOB | 2ND-NEAREST JOB | 3RD-NEAREST JOB |
|---|---|---|---|---|
| SOFTWARE ENGINEERING 305 MACHINE LEARNING | SOFTWARE ENGINEER, MACHINE LEARNING 307 COMPANY U (JOBID=13579) | SOFTWARE ENGINEER / SECURITY CONSULTANT, (0-3 YEARS) COMPANY V (JOBID=24680) | COMPUTER VISION SOFTWARE ENGINEER COMPANY X (JOBID=12468) | SOFTWARE ENGINEER (VISION) PRO COMPANY Y (JOBID=34515) |
| EDITOR 309 | SENIOR EDITOR, LIFESTYLE, COMPANY A 311 (JOBID=13748) | MULTIMEDIA PRODUCER COMPANY B (JOBID=19748) 313 | ASSISTANT EDITOR COMPANY C (JOBID=19874) | ASSISTANT MEDIA EDITOR (AE), COMPANY D (JOBID=21526) |
| LEGAL | ASSISTANT GENERAL COUNSEL, EXECUTIVE DIRECTOR COMPANY E (JOBID=19263) | LEGAL ADVISOR COMPANY F (JOBID=21543) | DIRECTOR, LEGAL COMPLIANCE COMPANY G (JOBID=12456) | INTELLECTUAL PROPERTY LITIGATION - EXPERIENCED LATERAL CANDIDATES ONLY COMPANY H (JOBID=14443) |

JOB RECOMMENDATION 900

| | J1 | J2 | J3 | ... | T1 | T2 | ... | S1 | S2 |
|---|---|---|---|---|---|---|---|---|---|
| M1 | 1 | 0 | 0 | | 0 | 1 | | 0 | 1 |
| M2 | 0 | 1 | 1 | | 1 | 0 | | 1 | 1 |
| M3 | 0 | 1 | 0 | | 0 | 1 | | 1 | 0 |
| ... | | | | | | | | | |
| Mm | 1 | 1 | 0 | | 1 | 1 | | 1 | 0 |

SIMILAR MEMBER RECOMMENDATION 1000

| | M1' | M2' | M3' | M4' | M5' | ... | Mn' |
|---|---|---|---|---|---|---|---|
| M1 | 1 | 0 | 0 | 1 | 0 | | 1 |
| M2 | 0 | 1 | 1 | 0 | 1 | | 1 |
| M3 | 0 | 1 | 0 | 1 | 0 | | 0 |
| ... | | | | | | | |
| Mm | 1 | 1 | 0 | 1 | 1 | | 0 |

SIMILAR JOB RECOMMENDATION — 1100

| | J1' | J2' | J3' | ... | T1 | T2 | ... | S1 | S2 | ... |
|---|---|---|---|---|---|---|---|---|---|---|
| J1 | 1 | 0 | 0 | | 1 | 0 | | 0 | 1 | |
| J2 | 0 | 1 | 1 | | 0 | 1 | | 1 | 1 | |
| J3 | 0 | 1 | 0 | | 1 | 0 | | 1 | 0 | |
| ... | | | | | | | | | | |
| Jm | 1 | 1 | 0 | | 1 | 1 | | 0 | 0 | |

MEMBER RECOMMENDATION — 1200

| | M1 | M2 | M3 | M4 | M5 | ... | Mn |
|---|---|---|---|---|---|---|---|
| J1 | 1 | 0 | 0 | 1 | 0 | | 1 |
| J2 | 0 | 1 | 1 | 0 | 1 | | 1 |
| J3 | 0 | 1 | 0 | 1 | 0 | | 0 |
| ... | | | | | | | |
| Jm | 1 | 1 | 0 | 1 | 1 | | 0 |

{1210} {1220}

EFFICIENT RECOMMENDATION SERVICES

TECHNICAL FIELD

An embodiment of the present subject matter relates generally to network matching and recommendation services, and, more specifically, to providing recommendations using random effects at a cluster level for more efficient operations.

BACKGROUND

Various mechanisms exist for services that match members to members, or members to elements/items or things, such as: recommending movies; news articles; songs; advertisements; dating services; match students to universities, such as for determining offers for the next entering class; and services that provide other matching and recommendation services, such as match members to jobs. For instance in a job searching and recommendation service, the service may provide for job searching; and match jobs to members, such as for recruiting. Members of a service may have different level of seniority, sign-in frequency, profile richness, browsing patterns, etc. Intuitively, it may be expected that members in different segments may have different intentions, and that their experience with the service should be tailored, and recommendations made accordingly. In existing systems, the member population of those using a service may be defined into concrete segments. For instance, a job search service may define segments such as: executive, active job-seekers, talent seekers, etc. Each distinct segment is typically served by a different service model. In the long run, as services evolve, the architecture and code for servicing these concrete segments may become difficult to understand and maintain, especially when considering that the defined segments may intersect in ways not able to be leveraged by legacy services.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 2 is a diagram illustrating a matrix for similar members in a job search and recommendation example, according to an embodiment;

FIG. 3 is a diagram illustrating a matrix for similar jobs, according to an embodiment;

FIG. 9 is diagram illustrating a matrix for job recommendations, according to an embodiment;

FIG. 10 is diagram illustrating a matrix for similar member recommendations, according to an embodiment;

FIG. 11 is diagram illustrating a matrix for similar job recommendations, according to an embodiment;

FIG. 12 is a diagram illustrating a matrix for member recommendations for a job, according to an embodiment;

DETAILED DESCRIPTION

Figure 1:
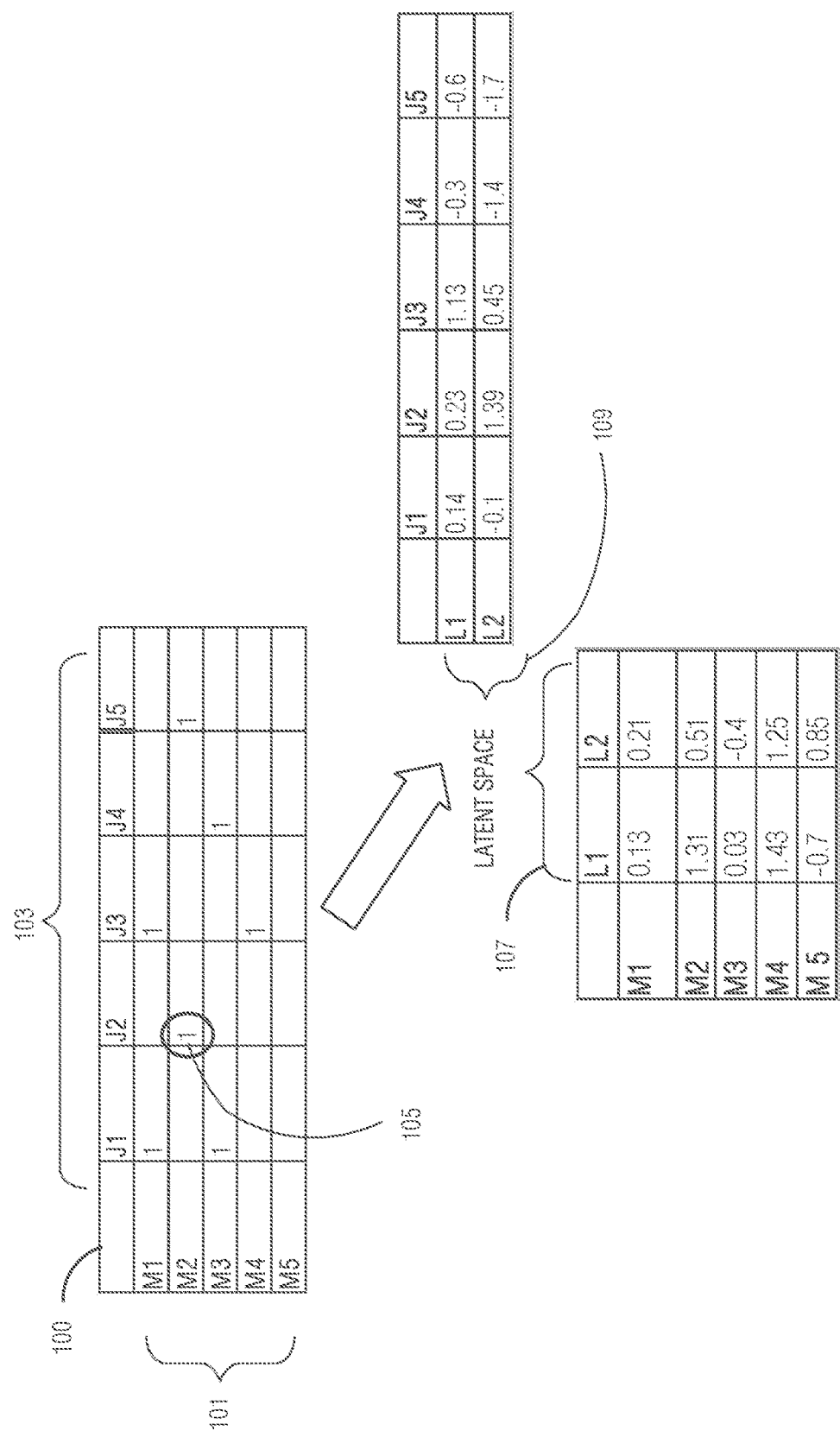
FIG. 1 is a diagram illustrating matrix factorization, according to an embodiment.

The following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter relates to identifying clusters and segments of a population using a service, and forming clusters of members where the clusters, or partitions are close to being equal in size (referred to herein as equi-sized partition). For purposes of illustration, embodiments are described herein within the context of a job and candidate searching application, or service. It will be understood that embodiments may be applied to other applications or services that inherently have a member population that may be formed into partitions, segments or clusters. Current job matching services typically perform personalization on an individual level. This results in each individual member having their own coefficients assigned, related to the matching. These coefficients are hard to maintain, and are only available for members who have already performed a search or matching request. Each member is represented by a vector, or list of coefficients. Elements of the coefficients may include job features, description of job, job title, etc. It will be understood that for other applications, that the coefficients will have different context. For instance, in the example of a dating service, the coefficients may represent preferences or profile criteria such as age, gender, height, hobbies, etc. For instance, in the example of a music matching service, the coefficients may represent song rating, recently listened, preferred genre, preferred artist, etc.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification axe not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

In the example of a job matching service, a memberID is crossed with job features. In some systems, the model may be trained daily. Also, there may be a great deal of movement or change within the set of coefficients. For example, for services using multiple data centers, the coefficients may be migrated or copied to other sites for mirroring, in addition to purposes of backing up the data. Coefficients may represent how important certain features in a member's profile are in the job search. For examples, current job title correlated with potential job title.

In an embodiment, a first coefficient (coefficient$_i$) may represent the similarity with the member's current job title as compared with the job title for a job opening. The similarity will yield a score. This score is multiplied with a coefficient that represents how much this similarity is valued. Another coefficient (coefficient$_i$) may be for similarity in a new job offering description and the member's current job description, as shown Equations (1) and (2), below.

$$\text{coefficient}_i = \text{model-coefficient(job title)} \times \text{similarity-score(job title), and} \quad \text{Eq. (1)}$$

$$\text{coefficient}_i = \text{model-coefficient(job description)} \times \text{similarity-score(job description).} \quad \text{Eq. (2)}$$

The model coefficient for a specific category (e.g., model-coefficient(category)) may be a global coefficient trained on the global set of data for all members, or a subset of members in a predefined category. In an example, the training looks at categories to determine how predictive the similarity is in predicting whether a member will apply for a job, in the case of matching a posted job with an individual.

In an embodiment, a member may not want their current job to be similar to their next job. In this example, a member level coefficient may be used which includes the memberID and job title. This indicates the delta, or offset, in how far the member level coefficient is off from the global, or model coefficient.

In an embodiment, a robust member/job interaction dataset may be used to generate a machine-learned embedding for each member/job that captures the collaborative effect between them. An embedding for a member/job refers to the vector associated with that member/job in the latent space, respectively. These embeddings may be used for various computations, e.g. member/job clustering, similar member/job search. In an example, a training application may be used with a job recommendation service. In an example service, members may receive recommendations for jobs via a job recommendation engine on an individual basis, using a member identifier (memberID) correlated with a job identifier (jobID). Individual computations for job recommendations may be very computation and resource intensive. Embodiments as described herein may act more efficiently if computations and recommendations may be made at a cluster level rather than an individual level. Efficiency of the service may be optimized or improved when clusters, or partitions are of similar or equal size.

In an embodiment, a generalized linear mixed model (GLMix) may be used by replacing the memberID/jobID level random effect with clusterID level random effect. A generalized linear model (GLM) is a family of algorithms that may include linear regression, logistic regression and Poisson regression. A GLM may represent global correlation of data within the dataset. In an example, a university may use a GLM to describe predictors for a successful student which may include GPA (grade point average), SAT (scholastic assessment test) scores, demographics, etc. The correlations made in the GLM are global. If, however, a university has knowledge or assumes that students from a particular school district show better (or worse) indicator for performance at a university level, then this factor may be combined with the GLM to result in a GLMix model, or a model mixed with a global model and a model with a level of personalization (e.g., school district-specific coefficients). In a GLMix model, the additional personalization are referred to as a random effect at the member level, or other subject level. These coefficients are specific to the member or subject of the regression. In the illustrative example of a job search and recommendation service, random level effects may be based on member coefficients, or job coefficients. A discussion of GLMix models and architectures may be found in the paper delivered at ACM Conference in Knowledge Discovery and Data Mining, Xianxing Zhang, et al., "GLMix: Generalized Linear Mixed Models For Large-Scale Response Prediction," KDD '16 Aug. 13-17, 2016, San Francisco, Calif., USA.

In an embodiment, members and jobs may be partitioned into clusters, as a mix to the trained global data in the dataset, and then the clusters may be used as a random effect in the recommendation process. In an example, the random effect is generated by clustering algorithms, as discussed below. Specifically, computations made at a cluster level reduce the model complexity, and also resolve the cold start issue of new member/job, or item. A cold start is the term used for a new member/job or item entered into the service where existing information about preferences is slim, and training does not yet include that item.

In an example job matching service, there may be a wide spectrum of members with different level of seniority, sign-in frequency, profile richness, browsing pattern, etc. It can be expected that members in different "segments" have different intention, and their experience and recommendation may be tailored, accordingly. An existing system may define concrete contours to segment the member population. For instance, there may be an executive segment, and an active job-seeking segment; each segment may be served by a different model. These segmentations, aside from being hard-coded, may become difficult to understand when considering intersection of these segments. The same drawback may also be present for jobs.

An embodiment may use a rich dataset corresponding to the matching and recommendation service to generate these contours of segment members and jobs into somewhat dynamic clusters, with each cluster representing a logical set of similar users, jobs, or more generically, items. In an example, the rich dataset may be trained daily, resulting in new cluster partitions within the dataset. From these clusters, a GLMix model may be obtained that is specific to each cluster. In an embodiment, there may be a variety of services offered that act differently on the data, and utilize a random effect based on different models, or cluster data that benefit from a cluster approach, as discussed below.

For instance, various clusters may be formed from the same dataset by varying the focus of the GLMix models. Thus, a service that recommends jobs a member might be interested in may use a model trained with a focus on jobs that similar members have viewed. A service that recommends members for a job may use a trained model that focused on similar jobs viewed by a member. Some services may use a model that the jobs as a cluster random effect and other services may use a model with members as a cluster random effect.

FIG. 1 is a diagram illustrating matrix factorization, according to an embodiment. Matrix factorization is an approach that may generate the embedding, or coefficient vectors, as discussed above. For example, a binary response matrix 100 is shown where the row space 101 represents members and the column space 103 represents jobs. An entry in the matrix 105 is a binary 1, if the member M2 has either viewed or applied for the job J2, and a binary 0, shown as an empty cell, otherwise. Standard matrix factorization techniques may map each user or job to a low-dimensional embedding, where the inner product reconstructs the response.

Similarity for users (or jobs) may be defined in terms of this low-dimensional space, e.g., Euclidean distance; or cosine similarity, which is a measure of direction-length resemblance between vectors. Once defined this way, any clustering algorithm, e.g., K-means, may be run to cluster the low-dimensional vectors. As discussed above, a cold start may be a significant issue in existing systems. For users (e.g., members) who have not yet viewed a job to show interest, the above approach may map the new users to all of the same vector (the zero vector, if the embedding function maps 0 to 0). One possible solution may be to include additional contextual features into the column space. For instance, if a member's industry and skills are added as additional columns, then low activity users who have some profile data in the system may be mapped into different vectors.

Latent factor methods train a model on some known data, for instance, extracting K members' and items' latent factors (also called latent features), and predict ratings by multiplying user factors by item factors. In the job recommendation example, a latent space associated with matrix 100 may be represented by latent space for members 107 and latent space for jobs 109. In this example, such K latent factors may be interpreted, as the amount of interest in a job, or value of a profile factor like job title, etc. In this example, the matrix factorization is a latent factor model method representing members and jobs as vectors derived from rating pattern. Service recommendations may be made using the results of the matrix factorization using a GLMix with cluster level random effects.

Latent space refers to the space formed by hidden (latent) dimensions after applying the matrix factorization. In the illustrated example, L1, L2 are the dimensions in the latent space. Specifically, row 1 of latent space 107 shows a two element embedding [0.13, 0.21] for member M1. Column 1 of latent space 109 shows a two element embedding [0.14, −0.1] for job J1. The embeddings are vectors filled with real numbers, and have the same dimension (the latent dimension). Similarities axe measured based on the distance between these vectors (e.g., embeddings), using, for example, Euclidean distance or cosine similarity.

FIG. 2 is a diagram illustrating a matrix for similar members in a job search and recommendation example, according to an embodiment. With the embeddings for each member, the K-nearest members of a given member, based on similarity, may be calculated, e.g., Euclidean distance or cosine similarity. In this example, a job category is shown in column one, row one 201, for software engineering and machine learning. This matrix may be used for a recruiter, desiring to find similar members. A first query member as shown in row one, column two 203. The third column shows the first nearest member 205, and the next column shows the second nearest member 207. The last column shows the third nearest member 209 to the query member 203. In this illustrative example, jobs for which a particular member has either viewed or applied are shown below the memberID in subsequent rows in the same column. For instance, the query member 203 has viewed or applied for a job as a lead data scientist, machine learning, position at Company A 211. The query member has also viewed or applied for a software engineer machine learning position at Company E 213. It may be seen that the first nearest member has viewed or applied for a position as data scientist marketing cloud platform at Company B 215. And the second nearest member has applied or viewed for a position as a data scientist intern at Company C 217.

FIG. 3 is a diagram illustrating a matrix for similar jobs, according to an embodiment. In an embodiment, the K-nearest jobs of a given job, based on embeddings, may be calculated. In the example, the three nearest jobs 303 for a given query job 301 are shown. In this example, the query job in the first row is a software engineer or machine learning position 305. The first nearest job similar to the query job is shown in column two as the software engineer II/security consultant 307. For a query job of senior editor, lifestyle 309, a first nearest job found may be a multimedia producer 311. The second nearest job may be an assistant editor 313.

Figure 4:
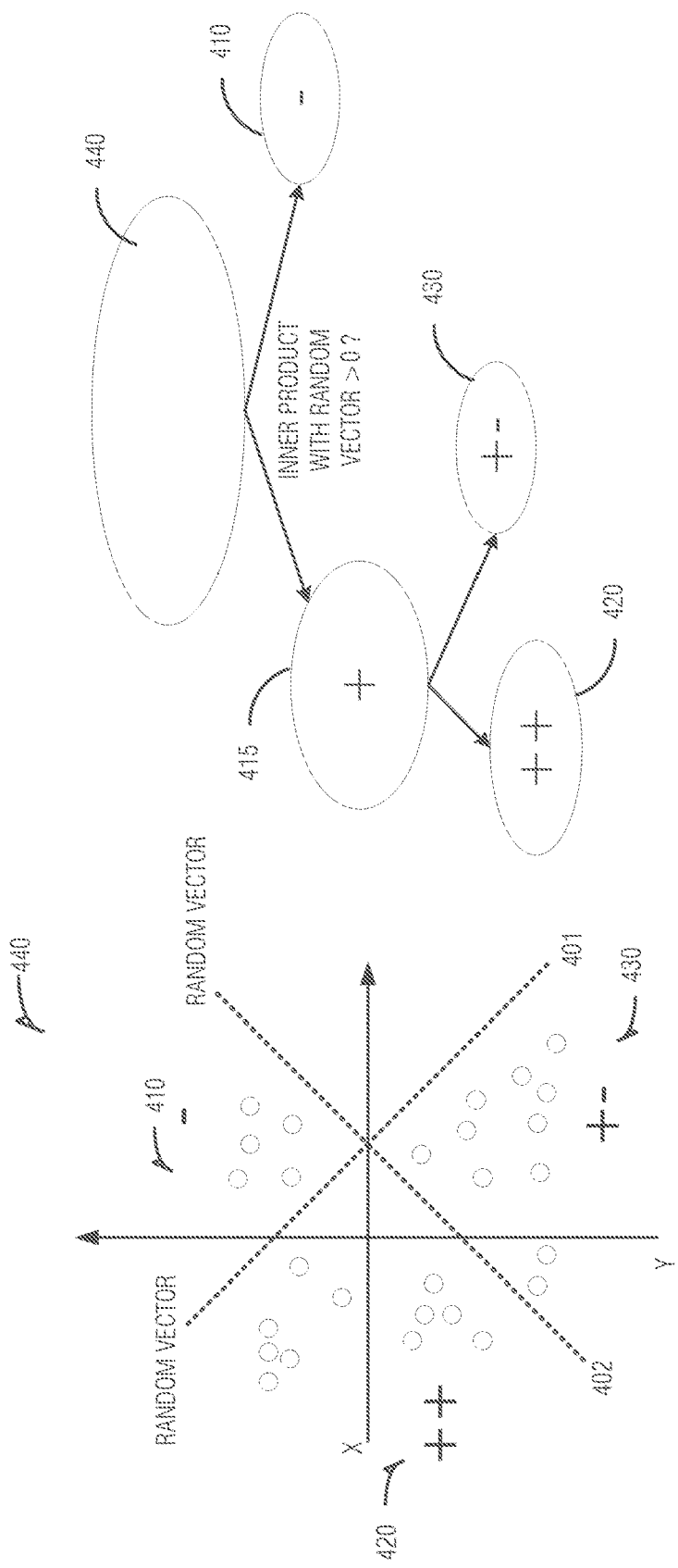
FIG. 4 illustrates balanced clustering, according to an embodiment.

FIG. 4 illustrates balanced clustering, according to an embodiment. Members are indicated on the graph as small circles and separated by an x and y axis delimiting characteristics of the member's embedding. It may be seen that the members are distributed throughout the graph. Random vectors 401 and 402 are drawn (virtually) through the graph to create a first cluster segmentation. Vectors drawn to segment the clusters are referred as hyperplanes, herein. In this example, Hyperplane 401 is selected randomly and bisects the space. Conceptually, members that fail on one side of the hyperplane may be represented as "+" member cluster 415 (420 plus 430), and members that fall on the other side of the hyperplane maybe represented as "−" member cluster 410. A second hyperplane 402 is drawn to further segment the clusters. These new clusters are represented with an additional "+" or "−" designation, resulting in a "++" segment 420 and a "+−" segment 430. In this example there is no "−−" or "−+" segment because no further segmentation of the "−" cluster 410 is necessary, with only five members. Specifically, members in clusters have an inner product with both the first random vector and the second random vector, which is an empty set for the "−−" area, in this example. It may be seen that the first segmentation has produced unbalanced clusters: cluster "−" 410 has five members; cluster "++" 420 has 11 members; and cluster "+−" 430 has 11 members. The matrix of member vectors 440 is segmented with random vectors 401 and 402, and the inner product is calculated as inner product for each of the member vectors with the random vector 401. The calculations result in clusters 410, 420, 430 and an empty cluster (not labeled).

Figure 5:
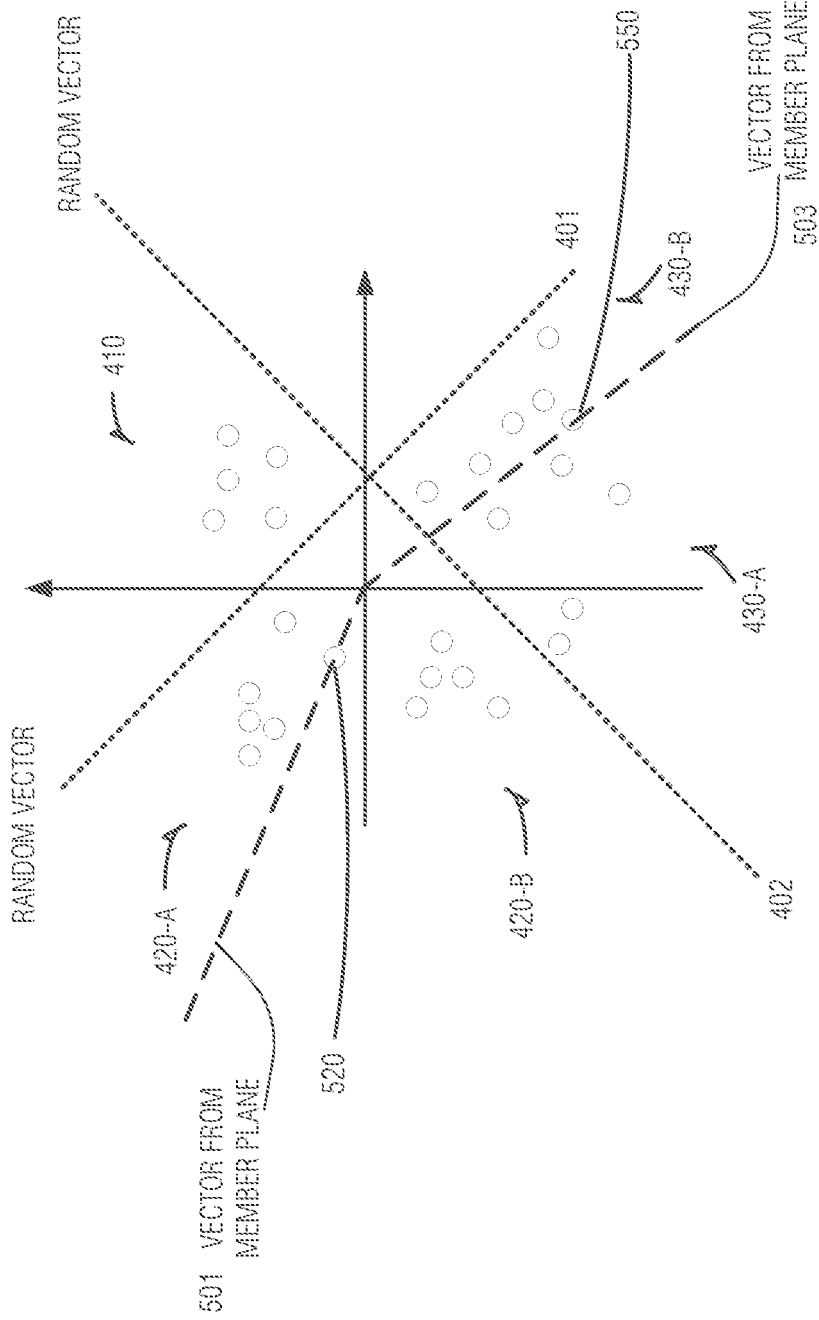
FIG. 5 illustrates cluster formation of another iteration of segmenting clusters, according to an embodiment.

FIG. 5 illustrates cluster formation of another iteration of segmenting clusters, according to an embodiment. In an embodiment, when a cluster is too large (e.g., above a size threshold), the cluster needs to be segmented again. A new hyperplane is formed and inner products for members are calculated with respect to the new hyperplane to assign a member to be above or below (e.g., plus or minus) the hyperplane. In an embodiment, the additional hyperplane is selected randomly. This randomness may increase the risk the hyperplane is formed with all members already on one side (e.g., inner product calculation all plus, or all minus) and the size remains the same. In another embodiment, the hyperplane may be formed from a member in the cluster.

The selection of the member may still be random, but also may provide a better likelihood that it will more evenly bisect the cluster. Various methods may be used to form a new hyperplane, other randomly, and context of the type of members or items may drive an optimum selection.

In the example as shown in FIG. 4, clusters 420 and 430 are too large, based on a pre-defined threshold. In an example, first cluster 420 is segmented again with hyperplane 501. In this example, hyperplane 501 is selected as a vector that begins at the origin of the graph and extends through member 520. Cluster 420 now has two cluster segments 420-A and 420-B, using the inner product calculation as shown in Eq. (3). In an example, for a given member m, the inner product is computed as in Eq. (3), below.

$$(\text{sign}<m, h_1>), \ldots, (\text{sign}<m, h_s>), \qquad \text{Eq. (3)}$$

In Eq. (3), m is the member vector, and $h_i$ is the vector for the hyperplane. For a linear matrix of 50 embeddings per member, $R^{50}$, then $h_1, h_2, \ldots, h_s \in R^{50}$. Once the inner product is computed, the sign (e.g., plus or minus) of the product is taken, resulting in a binary coding. In other words, the inner product of two real values is calculated, and if positive (e.g., "+") then a 1 may be assigned to the product. In an example, if the product is negative (e.g., "−"), then a value of 0 may be assigned. It should be noted that a −1 could have been assigned in place of the 0, and that it matters only that the positive and negative values are assigned different values to indicate as such. For instance, a TRUE or FALSE value may be assigned, in an example. This results in a binary representation of length s, where s is representative of similarities, and is indicative of the clusters. For instance, for a segmented vector space, assigned values of zero are assigned to one partition or cluster, and assigned values of one are assigned to a second partition or cluster. For instance, as described in FIG. 4, the first inner product with hyperplane 401 yields a plus or minus (e.g., "+" or "−"). The second inner product with the second hyperplane 402 yields a + or − with respect to that hyperplane 402. Thus, a third hyperplane iteration may yield a "+ + +", "+ + −", "+ − +", "+ − −", etc.

Once the Initial clusters are formed, then for each cluster of a large size, Eq. (3) may be repeated, as discussed above for cluster 420. For instance, referring to FIG. 4, clusters 410, 420 and 430 includes five, 11 and 11 members, respectively. It should be noted that the number of members is for illustration only, and each circle may represent any number of members. In an example, each circle may represent 10,000 members. In that examples, cluster 430 would include 110,000 members, and cluster 410 would include 50,000 members. As illustrated, it is easily seen that the clusters are of unequal size, and that clusters 420 and 430 are of a much larger size than cluster 410. In this example, Eq. (3) may be executed again, to further segment cluster 420 into 420-A and 420-B, and segment cluster 430 into cluster 430-A and 430-B, respectively, as discussed above. In an embodiment, a minimum cluster size may be pre-defined as a threshold. If cluster 410 is still too large, the further segmentation may be performed for cluster 410, as well, until each cluster is of sufficiently small size, and basically of the same or similar size. A threshold for variance of size may also be pre-defined. For instance, referring again to FIGS. 4 and 5, cluster 420 includes 11 members, and clusters 420-A and 420-B may include six and five members, respectively. Repeating segmentation of cluster 430 which has 11 members, using member 550 as the hyperplane vector, may result in cluster 430-A and 430-B having six and five members, respectively.

In an embodiment, segmenting the subsequent clusters may be executed more quickly as the segments becomes smaller, because each new hyperplane only needs to perform calculations for a subset of vectors within the cluster, and not the entire set of vectors in the entire trained space, $R^{50}$. For instance, in Eq. (4) hyperplane i ($h_i$) is shown as an dement $U_1$, where $U_i$ is an arbitrary member element of a specific cluster C.

$$h_i \in U_1 : U_i \in \text{Cluster\_C} \qquad \text{Eq. (4)}$$

In an embodiment, each cluster is further segmented, or partitioned, into smaller clusters until the size and variance thresholds are met. The initial hyperplanes may be selected randomly. Subsequent hyperplanes may be selected randomly, or based on a member in the large cluster, or using context information. For instance, as discussed above for cluster 420, member 550 may be selected for segmenting cluster 430. Once the member 550 is selected, the new hyperplane 503 is generated to intersect the origin of the graph, where the x-axis and y-axis intersect. In this example, hyperplane 503 is created to segment the member population of cluster 430 through member 550. In an embodiment, the selected member may be added to either of the partitions, or smaller clusters. Selection of a partition for this member may be an implementation detail that is chosen as always the upper/lower, left/right, +/−binary 0/binary 1 partition. In an embodiment, the selected member may be placed in the partition that will to make the new partitions more balanced.

In an embodiment, a hyperplane may be selected where one of the new partitions is significantly smaller than the threshold. Thus, with further iterations, that partition/cluster will continue to be much smaller than the other resulting clusters, e.g., resulting in a micro cluster. This may be permitted, as the new cluster will be small enough to avoid overloading the matching and recommendation services. This result may be fortunate for the members of the micro cluster, because fewer members that are more closely similar, may yield superior matching and recommendations. However, if too many micro clusters are formed, for instance, based on a poor selection of the hyperplanes, inefficiencies and increased compute times may result, as if the model were formed at the member or job level rather than a cluster level. In an embodiment, a micro cluster may be combined with an adjacent cluster. In an embodiment, there may be a threshold for minimum cluster size. Thus, if a minimum size threshold is violated, the clusters may be reset, and a new hyperplane selected, at any iteration, to be executed again, from scratch.

In an embodiment, if a micro cluster is formed, the current random hyperplane may be discarded, cluster members resampled, a new random hyperplane selected in the hopes that it will more evenly bisect the cluster. This process may be repeated if micro clusters continue to form. In an embodiment, if the resample attempt fails more than N times, then the cluster may be randomly split into two even sub-clusters. In an embodiment, the maximum number of attempts is 100, (e.g. N=100).

In an embodiment for job and member matching and recommendations, both the members and jobs are partitioned into clusters to be used with various services. In an embodiment, a service for making similar member recommendations for a member, may utilize clusters of members. For instance, a recruiter may want to send emails or job recommendations to people in a certain class or with certain experience level. Searching throughout the entire database of members may be cumbersome as well as time intensive and compute expensive. However, since clusters are generated based on similarities, if the recruiter finds one member that has suitable characteristics. A request to send information to similar members may send that information to a specific cluster. Similarly, in other matching services, for instance, a music recommendation service, there may be clusters of similar members and music may tend to cluster around artist or genre.

An embodiment may solve the cold start problem, as discussed above. In an example, a member is new to the matching and recommendation services and has little or no information in their profile that has been trained globally, e.g., the member has not yet viewed or applied for any jobs. With some profile information, for instance, a current job title, past job history, etc., similarities between that member and other members may be found, and used to add the member into a cluster of similar members. Once in the cluster. The member may receive similar notices as other members in the cluster and eventually will have a more robust and activity history such that their cluster identity will be more accurate.

In an embodiment, the new user may be placed in the graph according to some criteria. This placement may be random for a first entry, or be based on features specific to the member, for instance, current job title, salary, location, etc. Clusters adjacent to the new member may be recombined and cluster re-generated with the new member addition, as discussed above. Using these member level random effects enables the new users to be added to clusters more accurately, and avoids having a cluster of zero level effect because the new member has no global data features for similarity measurement. Similarly, newly added or modified jobs that have not been included in the training may be added to job clusters in the same fashion, using job level random effects. More generally, in a matching and recommendation service, any member or item that is to be matched or searched may be made a member of a cluster by utilizing the GLMix method of mixing both global data and item-level random effects or features.

Figure 6:
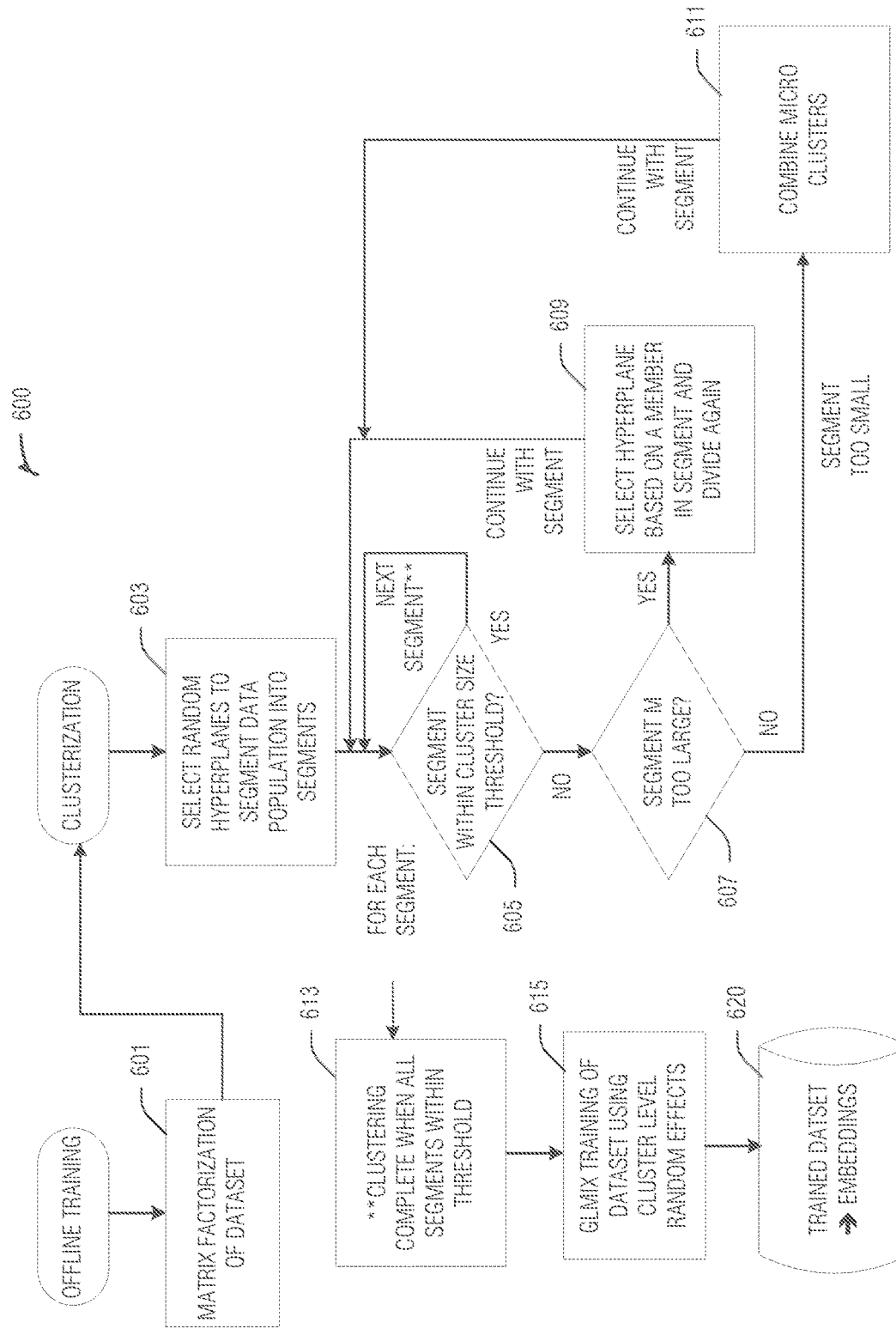
FIG. 6 is a flow diagram Illustrating a method for generating equi-sized clusters, according to an embodiment.

FIG. 6 is a flow diagram illustrating a method 600 for generating equi-sized clusters, according to an embodiment. In an embodiment, a matching and recommendation service has a population of data for items or members to be matched. The population of data is analyzed using matrix factorization in block 601, as discussed above. The matrix factorization may be performed on a daily, or other periodic basis, in an off-line training exercise. Once the matrix factorization has been completed, the data may then proceed to clusterization. In an embodiment, a variant of locality-sensitive hashing may be used to generate the first clustering. Based on the context of what is in the data set, clusters may be generated using different features, or coefficients. For instance, in the example of a service for making similar member recommendations, the data set may include coefficients related to jobs that have been viewed by multiple members (e.g., co-viewed) in the matrix factorization block. Clustering of members in the data set based on these co-view coefficients may be performed based on those factors. Once the features or coefficients of the data set have been selected for the appropriate service, the member vectors are effectively distributed throughout a graph having an x and y axis, in a representation. Random hyperplanes are selected in block 603 to partition the plane of the X, Y, axis. Selecting two hyperplanes basically partitions the plane into four segments. Each segment is analyzed to determine whether it falls within the minimum and maximum size threshold, as discussed above.

It is determined whether the segment is within the threshold, in block 605. If the segment is within the size threshold that is identified for a cluster for the members, or items, it is identified with a clusterID and the next segment is analyzed in block 605 to determine whether it is within the threshold size. If the segment is not within the minimum and maximum thresholds, it is determined whether the segment is too large, in block 607. ClusterIDs may be assigned to each member, job or item within the cluster.

If the segment is too large, it needs to be further partitioned, into smaller segments until each segment is within the threshold and can be identified as a cluster. For segments that are too large, an additional hyperplane is selected based on one of the members within the segment, and the segment is bisected again in block 609, as discussed above. For instance, a member may be randomly selected within the segment, and a hyperplane that begins at the origin of the x,y axis and is drawn through the member bisecting that segment. Once bisected, the process continues at block 605 to determine whether or not each of those partitions, or segments are within the size threshold for a cluster. If this segment is not within the threshold, as determined in block 605 and not too large, as determined and 607, then the segment is actually too small, and referred to herein as a micro cluster. Micro clusters may be combined in block 611, as discussed above, using various techniques. Once combined, the analysis continues again at block 605 to determine whether the combined segment is within the proper threshold of size. Once all of the segments and partitions of segments have been identified as clusters for the population of the data set, processing then continues in block 613. Once the clusters have been formed, then GLMix training of the data set using the cluster level random effects is performed in block 615. This GLMix training results in a trained data set, which may be stored in a database 620.

It will be understood that for different services, clustering and GLMix training may use different feature sets or embeddings/coefficients for the added personalization factors. For instance, as discussed above, for services conducting similar member recommendations based on cluster level random effects, the data set for matrix factorization may be configured based on the co-viewed set of members. In another example, for job recommendations based on cluster level random effects, the matrix factorization may be use a set of members and their views/applies as factors.

Figure 7:
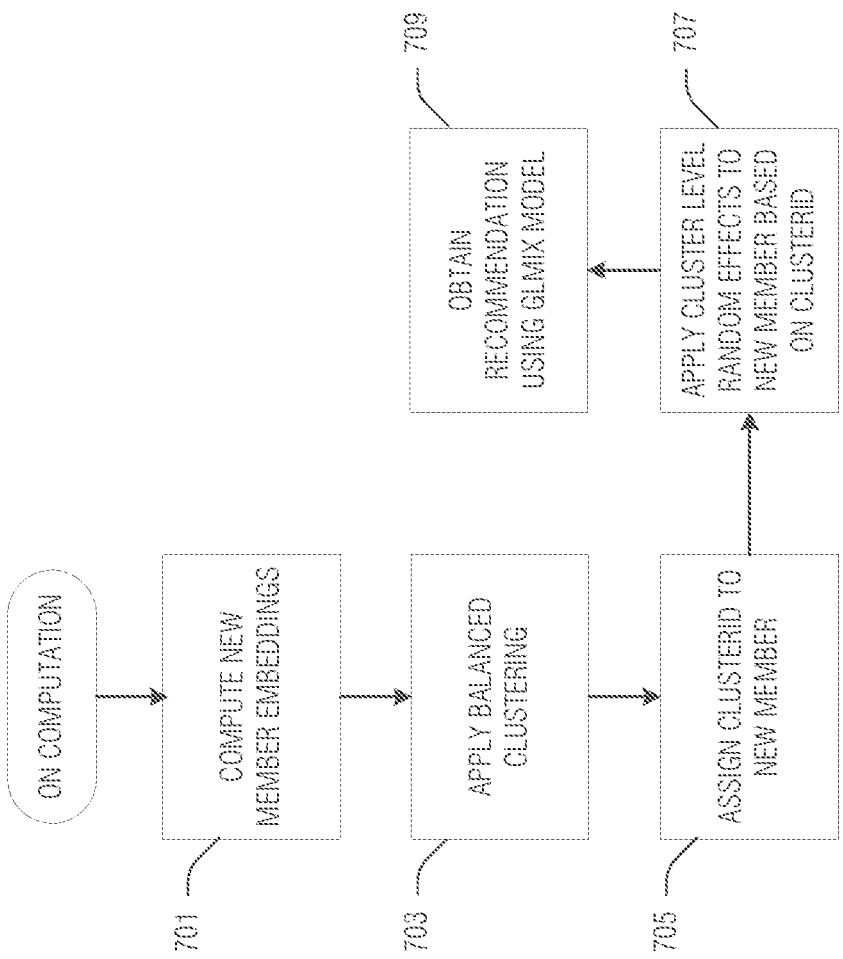
FIG. 7 is a flow diagram illustration a cold start method, according to an embodiment.

FIG. 7 is a flow diagram illustration a cold start method, according to an embodiment. Given a new member, the embedding for the member is computed in block 701. The balanced clustering algorithm as described above is applied in block 703. Based on the clustering, a clusterID is assigned to the new member in block 705.

In an embodiment, given a training time range, embeddings of members may be assumed to be within the training time range and their associated clustering have been obtained using matrix factorization and the balanced clustering algorithm, as described above. A new member may be defined as a member after the training time range that is not presented within the training time range. Depending on whether the new member has associated job view/apply activities, two different approaches may be used to obtain the member embeddings. For a new member that has an associated job view/apply activity, obtaining the member embedding may be obtained using a method similar to one step of alternating least squares (ALS) algorithm, in the matrix factorization. In an example, the job embeddings may be fixed from the training time range and the member embedding may be determined by minimizing the regularized reconstruction error. However, this approach does not apply to new members that do not have job view/apply activities, because the reconstruction error would force the member embeddings to be zero vectors. To mitigate this issue, a joint matrix factorization approach may be used that combines both the member-job interaction data and the member profile data to perform matrix factorization jointly. Using this joint approach, the embeddings obtained for members within the training time range are based on both member-job iterations and member profiles, while embeddings obtained for new members that do not have job view/apply activities are based on member profiles only. More broadly, the joint matrix factorization approach include personalized factors as well as the global factors. In the case of a member-job recommendation service, the personalization factors are titles, skill sets, etc., for members, and not just the activity interaction with the jobs.

Once the embeddings are obtained for both types of new members, the random vectors (e.g., hyperplanes) from the clustering results, as described above, may be used to assign clusterID to the new members, in block 705. The trained cluster level random effects are applied to the new member based on the clusterID, in block 707. The GLMix model with clusterID random effects may now be used to provide requested recommendations in block 709.

Figure 8:
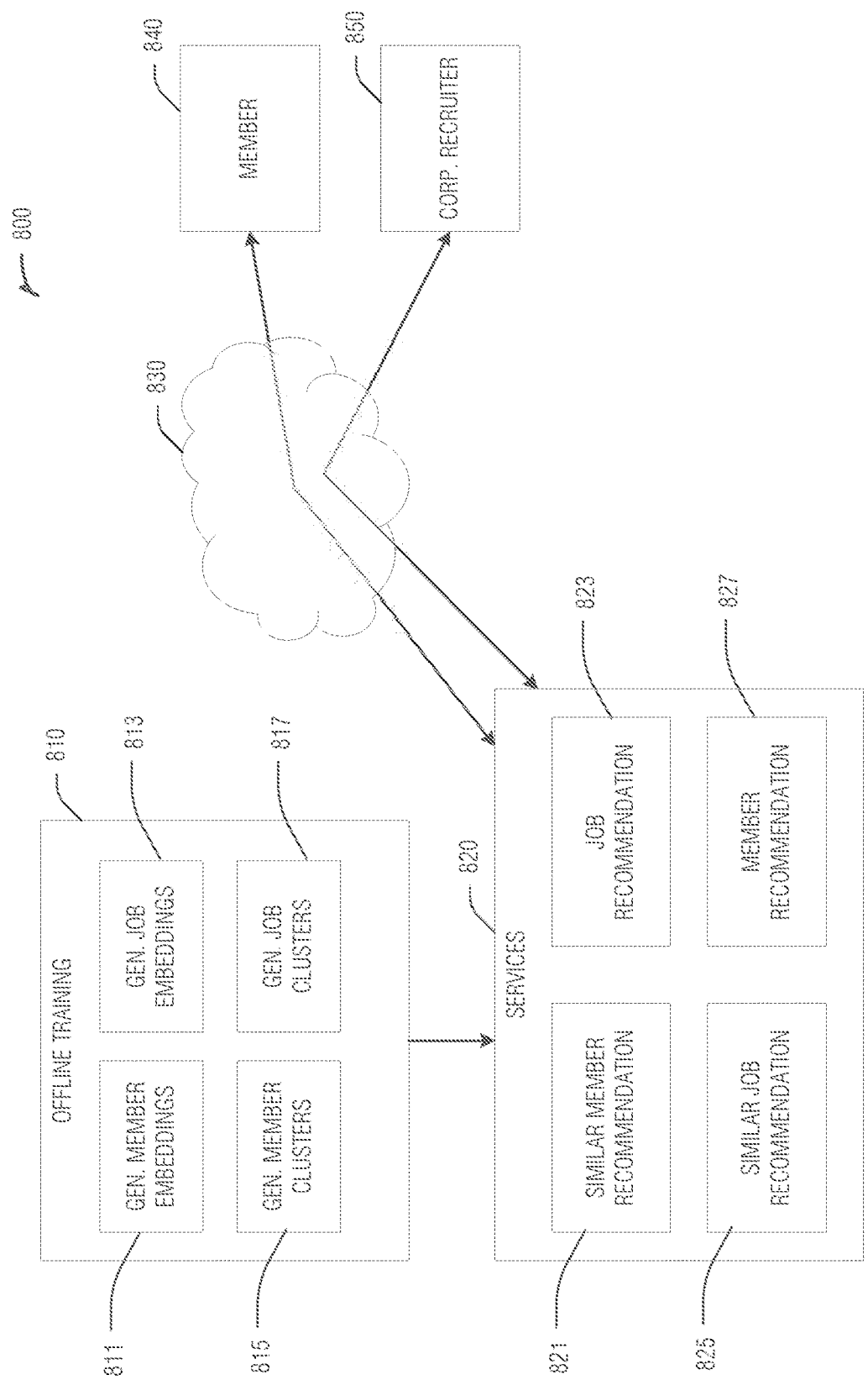
FIG. 8 is a block diagram illustrating a member-job recommendation service, according to an embodiment.

FIG. 8 is a block diagram illustrating a member-job recommendation system, or service, 800. In a recommendation system, users typically access a service via a network. In the example shown here, users may include members 840 and 850, for instance, members with profiles 840 and corporate recruiters 850. Members 840 and recruiters 850 may access online services 820 through network 830. Depending on which user 840 or 850 is accessing services 820, different services may be available to that user. For instance a corporate recruiter, or similar, may have a paid subscription to the recommendation services. With the paid service, recruiter 850 may have access to member recommendations for specific jobs they are posting. Users without paid subscriptions may have access to fewer services. For instance, a member, whether having premium services or not, may have access to job recommendations and similar job recommendations but cannot post a job or search for other members with respect to a job. Which services each member has access to may depend on the service owner's business model.

In this example, services available from the provider may include similar member recommendation service 821, job recommendation service 823, similar job recommendation service 825, and member recommendations for a job service 827. As previously discussed, in order to provide recommendations to members, first member clusters and job clusters are formed 815, 817. Also, based on which service is requested by the user, various generalized member embeddings 811 and generalized job embeddings 813 may be generated. In an embodiment, the cluster balancing of member clusters and job clusters may be performed offline in a training environment 810. The calculations for the generalized member and job embeddings 811, 813 may also be performed offline in 810. The training may be performed at various frequencies. In an embodiment, training may be performed daily or weekly, based on how often new members or new jobs enter the service.

When a new or untrained member requests a service, that member will be given a clusterID, as discussed above. Similarly, when a new or untrained job is generated in the service, the job will be given a clusterID, as well. Identifying a clusterID for new members or jobs may be performed online, or in real time, to provide the requested recommendation.

FIG. 9 is diagram illustrating a matrix for job recommendations, according to an embodiment. In this example, the matrix 900 used as the matrix factorization for job recommendations may include members $M_1$-$M_m$ along the rows 910, and jobs $J_1$-$J_i$ 920, title $T_1$-$T_j$ 930 and skills $S_1$-$S_k$ 940 as columns associated with each member. It should be understood that that the members 910 are correlated with two types of columns data: job fields 920 and member fields 930, 940. The matrix is encoded with binary values, indicating 0/1, YES/NO, or TRUE/FALSE, etc. For instance, if a member has viewed or applied for a job, that entry will be a 1. If not, then the value will be 0. If a member has a title in the matrix, then that value will be a 1. Similarly, if a member has a listed skill, then that value will be a 1. The title 930 and skills 940 are personalization factors specifically associated with the member's profile. If the matrix used included only members and jobs they had viewed or applied for, then members with no activity would all end up with a zero vector, as all fields in the matrix would have 0 values. Thus, adding the personalization factor allows the new member or job to be easily added to a cluster. In an embodiment, matrix factorization is performed with the interaction matrix $A_{n \times m}$ 900, where $$A_{m \times a} = U_{m \times d} V_{d \times n},$$

and where m is number of rows, and n is number of columns.

The value of d is small, so effectively, the matrix A 900 is factored into small slices of columns and rows, U and V. This is referred to as the member embedding, as discussed above. FIG. 10 is diagram illustrating a matrix for similar member recommendations, according to an embodiment. In this example, a similar member recommendation matrix 1000 may include rows of members 1010, identified as $M_1$-$M_m$, and columns of a second set of members 1020 identified as $M_1'$-$M_n'$. In this example, a value of 1 means that member Mm and Mn' have been co-viewed. Members $M_1$ and $M_2'$. for instance, are co-viewed when another member Mi has viewed both $M_1$ and $M_2'$. A co-view may occur in various contexts. In an example, member $M_1$ receives a connection request from member $M_2'$. If member $M_1$ does not personally know member $M_2'$, member $M_1$ may choose to view profiles of mutual connections to assess credibility of $M_2'$, or the value of a connection. Each member that member $M_1$ views in this process may be counted as co-viewed. In another example, a recruiter may be searching for viable job candidates. When viewing a member $M_3$ that closely matches the job requirements, the recruiter may choose to view other members similar to $M_3$ that may also match the job requirements. Those members viewed are considered to be co-viewed.

FIG. 11 is a diagram illustrating a matrix for similar job recommendations, according to an embodiment. In this example, the matrix 1100 used as the matrix factorization for similar job recommendations includes jobs $J_1$-$J_m$ along the rows 1110, and similar jobs $J_1'$-$J_i'$ 1120, title $T_1$-$T_j$ 1130 and skills $S_1$-$S_k$ 1140 as columns associated with each job. In this example, if jobs $J_1$ and $J_1'$ have been viewed by the same member, then their matrix entry is a 1. In an example if job $J_1$ has a title $T_1$, then that value will be a 1. Similarly, if a job requires a listed skill 1140, then that value will be a 1. The title 1130 and skills 1140 are personalization factors specifically associated with the job profile. If the matrix used included only jobs that had been co-viewed, then new jobs with no activity would all end up with a zero vector, as all fields in the matrix would have 0 values. Thus, adding the personalization factor allows the new job to be easily added to a cluster.

FIG. 12 is a diagram illustrating a matrix for member recommendations for a job, according to an embodiment. In this example, member recommendation matrix 1200 may include rows of jobs 1210, identified as J1-Jm, and columns of members 1220 identified as $M_1$-$M_n$. In this example, a value of 1 for Ji, Mj means that a recruiter chose (e.g., viewed, saved or contacted) member $M_j$ for job $J_i$.

Figure 13:
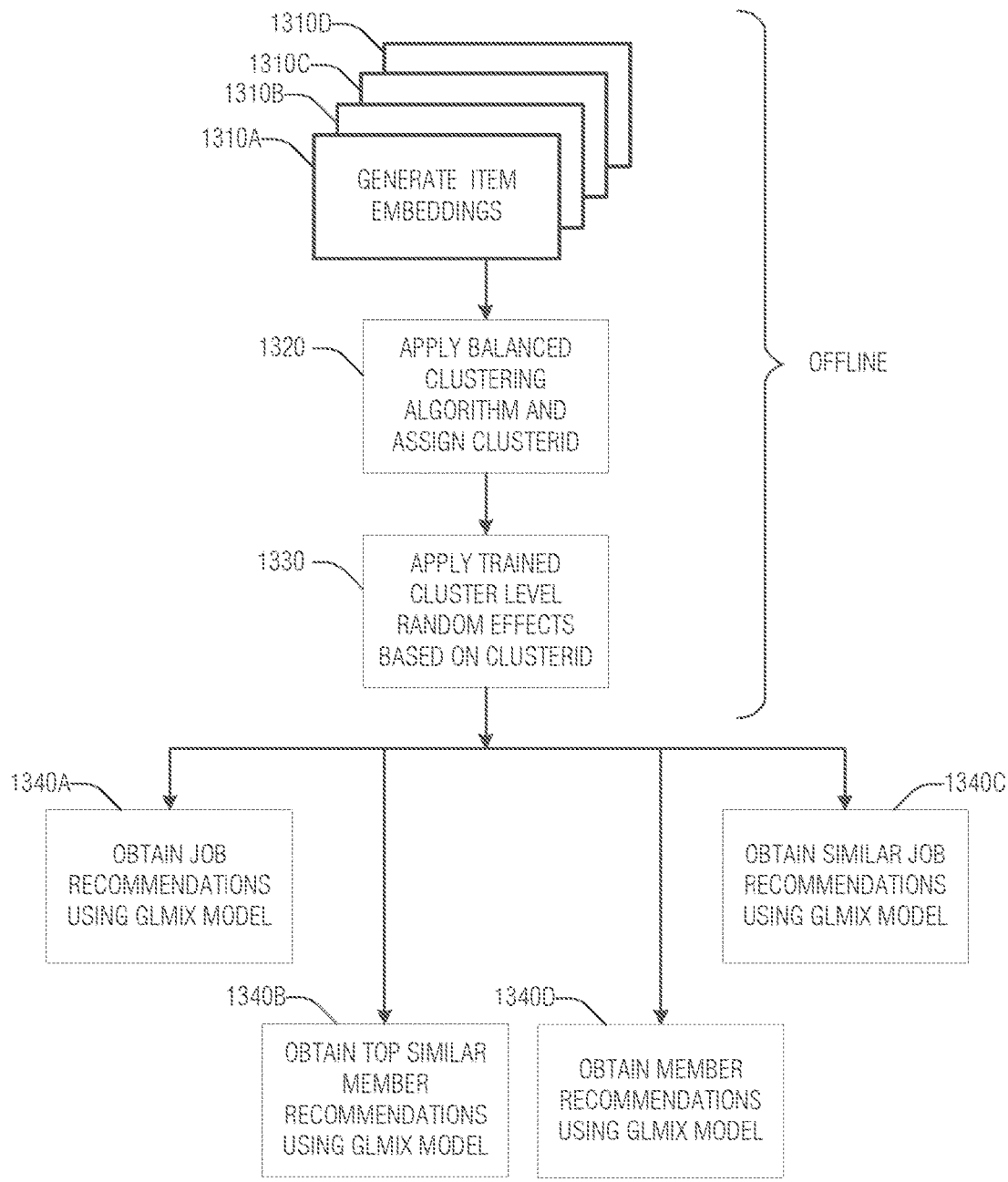
FIG. 13 is a flow chart illustrating methods for providing job recommendation services, according to an embodiment.

FIG. 13 is a flow chart illustrating methods for providing job recommendation services, according to an embodiment. As discussed above, the various services start with different relevant and correlated factors in the matrix used for matrix factorization. The job or member embeddings, are generated in block 1310A-D, depending on the applicable service. For instance, a matrix used for job recommendations, as described for FIG. 9, may be used to generate member embeddings in 1310A. A matrix used for similar member recommendations, as described for FIG. 10, may be used to generate member embeddings in 1310B. A matrix used for similar job recommendations, as described for FIG. 11, may be used to generate job embeddings in 1310C. And similarly, a matrix used for member recommendations for jobs, as described for FIG. 12, may be used to generate job embeddings in 1310D. Matrix factorization for each service may be performed for the applicable matrix to provide the item embeddings, where the term "item" is used to denote job or member embeddings, as appropriate.

Once the item embeddings are generated in block 1310, the cluster balancing algorithm, as described above, may be used to generate clusterIDs for the items, in block 1320. GLMix training may then be performed on the clusters to provide trained cluster level random effects based on the clusterID, in block 1330. It will be understood, that while the same procedure is used for various services, the embeddings, coefficients and trained models will differ based on which items and correlated factors are included in the initial matrix, and dataset.

The calculations and training, as described above, for 1310, 1320, and 1330 may be performed offline at a predetermined periodicity. The training may be performed on a server, offline from user interaction, and the periodicity of the training may depend on the size of the dataset, number of members and jobs, frequency that new members or jobs enter the system, or other factors. When a member requests a recommendation from one of the services, this request is deemed to be an "online" request.

In an example, a new member requests a job recommendation, in block 1340A. An embedding may be generated for the new member, and balanced clustering applied to assign a clusterID to the new member. Once a clusterID is assigned, the trained cluster level random effects (from block 1330) may be applied, in block 1340A to obtain the top job recommendations for the new member, using the underlying GLMix model, and based on the matrix factorization in 1310A.

In an example, a new member requests a similar member recommendation, in block 1340B. An embedding may be generated for the new member, and balanced clustering applied to assign a clusterID to the new member. Once a clusterID is assigned, the trained cluster level random effects (from block 1330) may be applied, in block 1340B to obtain the top similar member recommendations for the new member, using the underlying GLMix model, and based on the matrix factorization in 1310B.

In an example, a member requests a similar job recommendation for a newly posted job, in block 1340C. An embedding may be generated for the new job, and balanced clustering applied to assign a clusterID to the new job. Once a clusterID is assigned, the trained cluster level random effects (from block 1330) may be applied to the new job, in block 1340C to obtain the top similar job recommendations for the new member, using the underlying GLMix model, and based on the matrix factorization in 1310C.

In an example, a member requests a member recommendation for a job, in block 1340D. An embedding may be generated for the new job, and balanced clustering applied to assign a clusterID to the new job. Once a clusterID is assigned, the trained cluster level random effects (from block 1330) may be applied, in block 1340D to obtain the top member recommendations for the new job, using the underlying GLMix model, and based on the matrix factorization in 1310D.

It should be noted that the four examples above may be generalized to providing recommendations for other types of items. For instance, instead of job recommendations, a service may provide recommendations or matching for music, books, advertisements, school, movies, or other items. Each different type of recommendation engine will start with different factors in the underlying matrix. Matrix factorization will be performed on the customized matrix and a similar procedure followed for clustering items, and conducting GLMix training for cluster level random effects.

Figure 14:
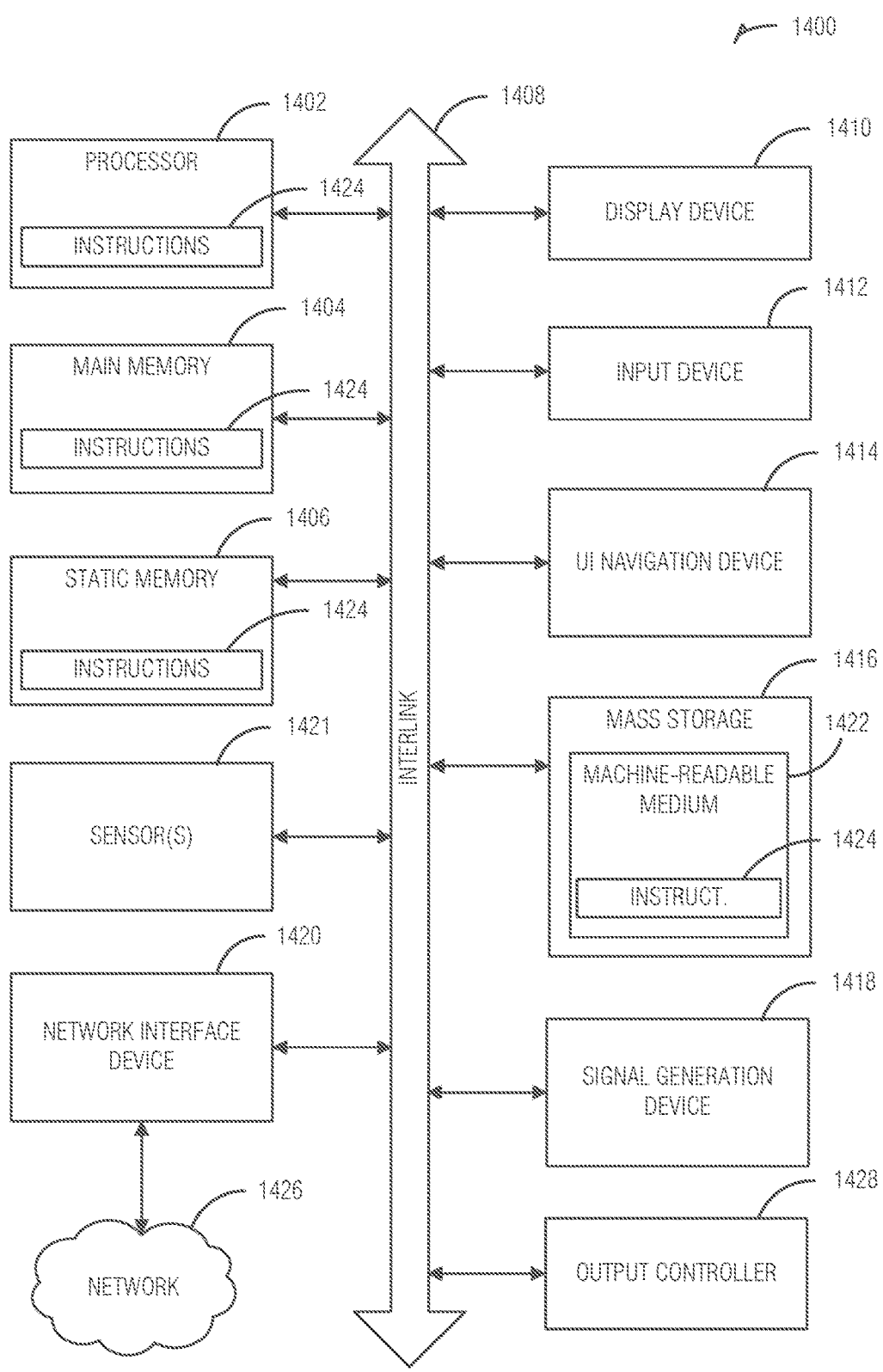
FIG. 14 is a block diagram illustrating an example of a machine upon which one or more embodiments may be implemented.

FIG. 14 illustrates a block diagram of an example machine 1400 upon which any one or more of the techniques (e.g., methodologies) discussed herein may be performed. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network rooter, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensor. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-Input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software.

ADDITIONAL NOTES AND EXAMPLES

Examples may include subject matter such as a method, means for performing acts of the method, at least one machine-readable medium including instructions that, when performed by a machine cause the machine to performs acts of the method, or of an apparatus or system for providing recommendations using balanced clusters of items, according to embodiments and examples described herein.

Example 1 is a computer readable storage medium having instructions for providing a recommendation using balanced clusters of items in a dataset, the instructions stored thereon, the instructions when executed on a machine cause the machine to: receive a new item; generate an embedding for the new item; apply cluster balancing to the new item embedding to assign the new item to a cluster, the cluster present in a trained model, wherein the trained model is stored in memory, when in operation is communicatively coupled to the machine, and wherein the trained model comprises cluster-level random effects in a generalized linear mixed modeling of the dataset, the trained model based on matrix factorization of a custom matrix, the custom matrix having custom factors that correlate items in the dataset, wherein the items in the dataset include at least two disparate item categories, the two disparate item categories correlated with each other based on at least one factor; and provide a recommendation corresponding to the new item and other items in the dataset.

In Example 2, the subject matter of Example 1 optionally includes wherein the custom factors include global factors to correlate items in the two disparate item categories, and personalization factors specific to an item in an item category.

In Example 3, the subject matter of any one or more of Examples 1-2 optionally include wherein the recommendation is a recommendation in a professional social network and the two disparate item categories comprise a member category and a job category, and further comprising instructions to provide a job recommendation, a top similar member recommendation, a top similar job recommendation, or a member recommendation for a job.

In Example 4, the subject matter of Example 3 optionally includes wherein the custom matrix for the job recommendation comprises rows of m members, $M_m$, and columns of jobs and member-specific personalization factors, wherein a job is positively correlated with a member $M_i$ when the member $M_i$ has previously viewed or applied for the job, and wherein the member $M_i$ is positively correlated to a member-specific personalization factor $F_j$ when the factor $F_j$ is identified in a profile associated with member $M_i$.

In Example 5, the subject matter of Example 3 optionally includes wherein the custom matrix for the top similar member recommendation comprises rows of m members, Mm, and columns of $M'_n$ members, wherein a member $M_i$ is positively correlated with a member $M'_j$ when the members $M_i$ and $M'_j$ have both been previously viewed by third member $M_k$.

In Example 6, the subject matter of Example 3 optionally includes wherein the custom matrix for the top similar job recommendation comprises rows of m jobs, $J_m$, and columns of jobs $J'_i$ and job-specific personalization factors, wherein a job $J_i$ is positively correlated with a job $J'_j$ when the jobs $J_i$ and $J'_j$ have been previously viewed or applied for by a same member, and wherein job $J_i$ is positively correlated with a job-specific personalization factor when the job-specific personalization factor is identified in a profile associated with job $J_i$.

In Example 7, the subject matter of Example 3 optionally includes wherein the custom matrix for the member recommendation comprises rows of m jobs, $J_m$, and columns of n members $M_n$, wherein a job $J_i$ is positively correlated with a member $M_j$ when a user viewed, saved or contacted member $M_j$ for job $J_i$.

Example 8 is a computer readable storage medium having instructions stored thereon, the instructions when executed on a machine cause the machine to: generate coefficient vectors for a first set of items in a dataset, and to generate coefficient vectors for a second set of items in the dataset for matrix factorization; cluster balance each set of items to assign each item in the dataset into a corresponding cluster of a plurality of clusters, wherein the item clusters are substantially similar in size within a size variance threshold: perform training to use clusters of the first set of items or clusters of the second set of item as a cluster-level random effect in a generalized linear mix modeling of the dataset, to generate a trained item model and store the trained item model in a data storage device, when in operation, the data storage device accessible by the machine; and provide a recommendation service to users, the recommendation service comprising a plurality of recommendation types, wherein the training is arranged to use a matrix customized for use with a selected recommendation type.

In Example 9, the subject matter of Example 8 optionally includes wherein first and second set of items comprise two disparate item categories, and wherein the item categories include a member category and a job category, and wherein items in the job category are each assigned to a corresponding job cluster, and items in the member category are each assigned to a corresponding member cluster.

In Example 10, the subject matter of Example 9 optionally includes wherein the instructions to provide the recommendation service further comprise instructions to: retrieve the trained model from the data storage device; and provide a recommendation based on the cluster-level random effect corresponding to either the job cluster or the member cluster.

In Example 11, the subject matter of any one or more of Examples 8-10 optionally include wherein the instructions to cluster balance further comprise instructions to: bisect a segment in a graph into new segments, the segment including items corresponding to an item category, the bisection to be performed along a hyperplane corresponding to a selected item in the segment of the graph; and continue to bisect or combine the segment and resulting new segments until each resulting new segment includes a number of items corresponding to the item category, wherein the number of items fall within a size threshold, and wherein each resulting new segment is assigned a unique clusterID.

In Example 12, the subject matter of any one or more of Examples 9-11 optionally include wherein the recommendation service is a recommendation service in a professional social network, and wherein the recommendation service comprises instructions to provide a job recommendation, a top similar member recommendation, a top similar job recommendation, or a member recommendation for a job.

In Example 13, the subject matter of Example 12 optionally includes wherein the matrix customized for use with the job recommendation comprises rows of m members, $M_m$, and columns of jobs and member-specific personalization factors, wherein a job is positively correlated with a member $M_i$ when the member $M_i$ has previously viewed or applied for the job, and wherein the member $M_i$ is positively correlated to a member-specific personalization factor $F_j$ when the factor $F_j$ is identified in a profile associated with member $M_i$.

In Example 14, the subject matter of Example 12 optionally includes wherein the matrix customized for use with the top similar member recommendation comprises rows of m members, $M_m$, and columns of $M'_n$ members, wherein a member $M_i$ is positively correlated with a member $M'_j$ when the members $M_i$ and $M'_j$ have both been previously viewed by third member $M_k$.

In Example 15, the subject matter of Example 12 optionally includes wherein the matrix customized for use with the top similar job recommendation comprises rows of m jobs, $J_m$, and columns of jobs $J'_i$ and job-specific personalization factors, wherein a job $J_i$ is positively correlated with a job $J'_j$ when the jobs $J_i$ and $J'_j$ have been previously viewed or applied for by a same member, and wherein job $J_i$ is positively correlated with a job-specific personalization factor when the job-specific personalization factor is identified in a profile associated with job $J_i$.

In Example 16, the subject matter of Example 12 optionally includes wherein the matrix customized for use with the member recommendation for a job comprises rows of m jobs, $J_m$, and columns of n members $M_n$, wherein a job $J_i$ is positively correlated with a member $M_j$ when a user viewed, saved or contacted member $M_j$ for job $J_i$.

Example 17 is a machine implemented method for providing recommendations, comprising: generating item embeddings using matrix factorization for a set of items in a dataset wherein each item in the set of items corresponds to an item category, wherein the dataset includes at least two disparate item categories, the two disparate item categories correlated with each other based on at least one factor, and wherein a matrix used in the matrix factorization is customized for items or factors based on a recommendation type; balancing clusters of items in the dataset, wherein clusters of an items in a same item category are substantially similar in size within a size variance threshold; assigning each item in the set of items in the dataset to a cluster, as determined in the balancing clusters of items; and generating a trained model with cluster-level random effects in a generalized linear mix modeling of the dataset using the assigned clusters of items; and providing a recommendation to a user, the recommendation based on the trained model.

In Example 18, the subject matter of Example 17 optionally includes generating an embedding for a new item, the new item not in the trained model; assigning the new item to an assigned cluster by repeating the balancing clusters with the new item; applying the cluster level random effects of the trained model for the assigned cluster; and providing the recommendation to a user, the recommendation based on the trained model using cluster level random effects associated with the assigned cluster.

In Example 19, the subject matter of Example 18 optionally includes wherein the recommendation is associated with a recommendation in a professional social network and the two disparate item categories comprise a member category and a job category, and the recommendation provided to a user, is one of a job recommendation, a top similar member recommendation, a top similar job recommendation, or a member recommendation for a job.

In Example 20, the subject matter of Example 19 optionally includes wherein the matrix used in the matrix factorization is customized with correlations among members, jobs, and personalization factors, wherein the personalization factors are specific to the members or jobs.

Example 21 is a system for providing a recommendation using balanced clusters of items in a dataset, comprising: a processor including memory, the processor arranged to execute logic stored in the memory; a datastore to store a trained model comprising cluster-level random effects in a generalized linear mixed modeling of the dataset, the trained model based on matrix factorization of a custom matrix, the custom matrix having custom factors that correlate items in the dataset, wherein the items in the dataset include at least two disparate item categories, the two disparate item categories correlated with each other based on at least one factor; new item logic arranged to receive a new item and generate an embedding for the new item and to apply cluster balancing to the new item embedding to assign the new item to a cluster, the cluster present in the trained model; and a recommendation engine arranged to provide a recommendation corresponding to the new item and other items in the dataset.

In Example 22, the subject matter of Example 21 optionally includes wherein the recommendation is a recommendation in a professional social network and the two disparate item categories comprise a member category and a job category, and wherein the recommendation engine is arranged to provide a job recommendation, a top similar member recommendation, a top similar job recommendation, or a member recommendation for a job.

In Example 23, the subject matter of Example 22 optionally includes wherein the custom matrix for the job recommendation comprises rows of m members, $M_m$, and columns of jobs and member-specific personalization factors, wherein a job is positively correlated with a member $M_i$ when the member $M_i$ has previously viewed or applied for the job, and wherein the member $M_i$ is positively correlated to a member-specific personalization factor $F_j$ when the factor $F_j$ is identified in a profile associated with member $M_i$.

In Example 24, the subject matter of Example 22 optionally includes wherein the custom matrix for the top similar member recommendation comprises rows of m members, $M_m$, and columns of $M'_j$ members, wherein a member $M_i$ is positively correlated with a member $M'_j$ when the members $M_i$ and $M'_j$ have both been previously viewed by third member $M_k$.

In Example 25, the subject matter of Example 22 optionally includes wherein the custom matrix for the top similar job recommendation comprises rows of m jobs, $J_m$, and columns of jobs $J'_i$ and job-specific personalization factors, wherein a job $J_i$ is positively correlated with a job $J'_j$ when the jobs Ji and $J'_j$ have been previously viewed or applied for by a same member, and wherein job $J_i$ is positively correlated with a job-specific personalization factor when the job-specific personalization factor is identified in a profile associated with job $J_i$.

In Example 26, the subject matter of Example 22 optionally includes wherein the custom matrix for the member recommendation comprises rows of m jobs, $J_m$, and columns of n members $M_n$, wherein a job $J_i$ is positively correlated with a member $M_j$ when a user viewed, saved or contacted member $M_j$ for job $J_j$.

Example 27 is a recommendation server, comprising: a compute node having a processor and memory and coupled to a data storage device, wherein the processor is configured to execute logic for: matrix factorization to generate coefficient vectors for a first set of items in a dataset, and to generate coefficient vectors for a second set of items in the dataset; cluster balancing each set of items to assign each item in the dataset into a corresponding cluster of a plurality of clusters, wherein the item clusters are substantially similar in size within a size variance threshold; training arranged to use clusters of the first set of items or clusters of the second set of item as a cluster-level random effect in a generalized linear mix modeling of the dataset, to generate a trained item model and store the trained item model in the data storage device, when in operation the data storage device accessible by the recommendation server; and providing a recommendation service to users, the recommendation service comprising a plurality of recommendation types, wherein the logic for training is arranged to use a matrix customized for use with a selected recommendation type.

In Example 28, the subject matter of Example 27 optionally includes wherein first and second set of items comprise two disparate item categories, and wherein the item categories include a member category and a job category, and wherein items in the job category are each assigned to a corresponding job cluster, and items in the member category are each assigned to a corresponding member cluster.

In Example 29, the subject matter of Example 28 optionally includes wherein the recommendation service is arranged to retrieve the trained model from the data storage device and provide a recommendation based on the cluster-level random effect corresponding to either the job cluster or the member cluster.

In Example 30, the subject matter of any one or more of Examples 27-29 optionally include wherein the logic for cluster balancing further comprises: balancing logic arranged to bisect a segment in a graph into new segments, the segment including items corresponding to an item category, the bisection to be performed along a hyperplane corresponding to a selected item in the segment of the graph, the balancing logic further arranged to continue to bisect or combine the segment and resulting new segments until each resulting new segment includes a number of items corresponding to the item category, wherein the number of items fell within a size threshold, and wherein each resulting new segment is assigned a unique clusterID.

In Example 31, the subject matter of any one or more of Examples 28-30 optionally include wherein the recommendation service is a job recommendation service, and wherein the recommendation service is arranged to provide a job recommendation, a top similar member recommendation, a top similar job recommendation, or a member recommendation for a job.

In Example 32, the subject matter of Example 31 optionally includes wherein the matrix customized for use with the job recommendation comprises rows of m members, $M_m$, and columns of jobs and member-specific personalization factors, wherein a job is positively correlated with a member $M_i$ when the member $M_i$ has previously viewed or applied for the job, and wherein the member $M_i$ is positively correlated to a member-specific personalization factor $F_j$ when the factor $F_j$ is identified in a profile associated with member $M_i$.

In Example 33, the subject matter of Example 31 optionally includes wherein the matrix customized for use with the top similar member recommendation comprises rows of m members, $M_m$, and columns of $M'_n$ members, wherein a member $M_i$ is positively correlated with a member $M'_j$ when the members $M_i$ and $M'_j$ have both been previously viewed by third member $M_k$.

In Example 34, the subject matter of Example 31 optionally includes wherein the matrix customized for use with the top similar job recommendation comprises rows of m jobs, $J_m$, and columns of jobs $J'_i$ and job-specific personalization factors, wherein a job $J_i$ is positively correlated with a job $J'_j$ when the jobs $J_i$ and $J'_i$ have been previously viewed or applied for by a same member, and wherein job $J_i$ is positively correlated with a job-specific personalization factor when the job-specific personalization factor is identified in a profile associated with job $J_i$.

In Example 35, the subject matter of Example 31 optionally includes wherein the matrix customized for use with the member recommendation tor a job comprises rows of m jobs, $J_m$, and columns of n members $M_n$, wherein a job $J_i$ is positively correlated with a member $M_j$ when a user viewed, saved or contacted member $M_j$ for job $J_i$.

Example 36 is a system configured to perform operations of any one or more of Examples 1-35.

Example 37 is a method for performing operations of any one or more of Examples 1-35.

Example 38 is a machine readable medium including instructions that, when executed by a machine cause the machine to perform the operations of any one or more of Examples 1-35.

Example 39 is a system comprising means for performing the operations of any one or more of Examples 1-35.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware rising a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner, in an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the fallowing claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A computer readable storage medium having instructions for providing a recommendation using balanced clusters of items in a dataset, the instructions stored thereon, the instructions when executed on a machine cause the machine to:
   receive a new item;:
   generate an embedding for the new item;
   apply cluster balancing to the new item embedding to assign the new item to a cluster, the cluster present in a trained model, wherein the trained model is stored in memory, when in operation is communicatively coupled to the machine, and wherein the trained model comprises cluster-level random effects in a generalized linear mixed modeling of the dataset, the trained model based on matrix factorization of a custom matrix, the custom matrix having custom factors that correlate items in the dataset, wherein the items in the dataset include at least two disparate item categories, the two disparate item categories correlated with each other based on at least one factor; and
   provide a recommendation corresponding to the new item and other items in the dataset.

2. The medium as recited in claim 1, wherein the custom factors include global factors to correlate items in the two disparate item categories, and personalization factors specific to an item in an item category.

3. The medium as recited in claim 1, wherein the recommendation is a recommendation in a professional social network and the two disparate item categories comprise a member category and a job category, and further comprising instructions to provide a job recommendation, a top similar member recommendation, a top similar job recommendation, or a member recommendation for a job.

4. The medium as recited in claim 3, wherein the custom matrix for the job recommendation comprises rows of m members, $M_m$, and columns of jobs and member-specific personalization factors, wherein a job is positively correlated with a member $M_i$ when the member $M_i$ has previously viewed or applied for the job, and wherein the member $M_i$ is positively correlated to a member-specific personalization factor $F_j$ when the factor $F_j$ is identified in a profile associated with member $M_i$.

5. The medium as recited in claim 3, wherein the custom matrix for the top similar member recommendation comprises rows of m members, $M_m$, and columns of $M'_n$ members, wherein a member $M_i$ is positively correlated with a member $M'_j$ when the members $M_i$ and $M'_j$ have both been previously viewed by third member $M_k$.

6. The medium as recited in claim 3, wherein the custom matrix for the top similar job recommendation comprises rows of m jobs, $J_m$, and columns of jobs $J'_i$ and job-specific personalization factors, wherein a job $J_i$ is positively correlated with a job $J'_j$ when the jobs $J_i$ and $J'_j$ have been previously viewed or applied for by a same member, and wherein job $J_i$ is positively correlated with a job-specific personalization factor when the job-specific personalization factor is identified in a profile associated with job $J_i$.

7. The medium as recited in claim 3, wherein the custom matrix for the member recommendation comprises rows of m jobs, $J_m$, and columns of n members $M_n$, wherein a job $J_i$ is positively correlated with a member $M_j$ when a user viewed, saved or contacted member $M_j$ for job $J_i$.

8. A computer readable storage medium having instructions stored thereon, the instructions when executed on a machine cause the machine to:
generate coefficient vectors for a first set of items in a dataset, and to generate coefficient vectors for a second set of items in the dataset for matrix factorization;
cluster balance each set of items to assign each item in the dataset into a corresponding cluster of a plurality of clusters, wherein the item clusters are substantially similar in size within a size variance threshold;
perform training to use clusters of the first set of items or clusters of the second set of item as a cluster-level random effect in a generalized linear mix modeling of the dataset, to generate a trained item model and store the trained item model in a data storage device, when in operation, the data storage device accessible by the machine; and
provide a recommendation service to users, the recommendation service comprising a plurality of recommendation types, wherein the training is arranged to use a matrix customized for use with a selected recommendation type.

9. The medium as recited in claim 8, wherein first and second set of items comprise two disparate item categories, and wherein the Item categories include a member category and a job category, and wherein items in the job category are each assigned to a corresponding job cluster, and items in the member category are each assigned to a corresponding member cluster.

10. The medium as recited in claim 9, wherein the instructions to provide the recommendation service further comprise instructions to:
retrieve the trained model from the data storage device; and
provide a recommendation based on the cluster-level random effect corresponding to either the job cluster or the member cluster.

11. The medium as recited in claim 8, wherein the instructions to cluster balance further comprise instructions to:
bisect a segment in a graph into new segments, the segment including items corresponding to an item category, the bisection to be performed along a hyperplane corresponding to a selected item in the segment of the graph; and
continue to bisect or combine the segment and resulting new segments until each resulting new segment includes a number of items corresponding to the item category, wherein the number of items fall within a size threshold, and wherein each resulting new segment is assigned a unique clusterID.

12. The medium as recited in claim 9, wherein the recommendation service is a recommendation service in a professional social, network, and wherein the recommendation service comprises instructions to provide a job recommendation, a top similar member recommendation, a top similar job recommendation, or a member recommendation for a job.

13. The medium as recited in claim 12, wherein the matrix customized for use with the job recommendation comprises rows of m members, $M_m$, and columns of jobs and member-specific personalization factors, wherein a job is positively correlated with a member $M_i$ when the member $M_i$ has previously viewed or applied for the job, and wherein the member $M_i$ is positively correlated to a member-specific personalization factor $F_j$ when the factor $F_j$ is identified in a profile associated with member $M_i$.

14. The medium as recited in claim 12, wherein the matrix customized for use with the top similar member recommendation comprises rows of m members, $M_m$, and columns of $M'_n$ members, wherein a member $M_i$ is positively correlated with a member $M'_j$ when the members $M_i$ and $M'_j$ have both been previously viewed by third member $M_k$.

15. The medium as recited in claim 12, wherein the matrix customized for use with the top similar job recommendation comprises rows of m jobs, $J_m$, and columns of jobs $J'_i$ and job-specific personalization factors, wherein a job $J_i$ is positively correlated with a job $J'_j$ when the jobs $J_i$ and $J'_j$ have been previously viewed or applied for by a same member, and wherein job $J_i$ is positively correlated with a job-specific personalization factor when the job-specific personalization factor is identified in a profile associated with job $J_i$.

16. The medium as recited in claim 12, wherein the matrix customized for use with the member recommendation for a job comprises rows of m jobs, $J_m$, and columns of n members $M_n$, wherein a job $J_i$ is positively correlated with a member $M_j$ when a user viewed, saved or contacted member $M_j$ for job $J_i$.

17. A machine implemented method for providing a recommendation, comprising:
generating item embeddings using matrix factorization for a set of items in a dataset wherein each item in the set of items corresponds to an item category, wherein the dataset includes at least two disparate item categories, the two disparate item categories correlated with each other based on at least one factor, and wherein a matrix used in the matrix factorization is customized for items or factors based on a recommendation type;

balancing clusters of items in the dataset, wherein clusters of an items in a same item category are substantially similar in size within a size variance threshold;

assigning each item in the set of items in the dataset to a cluster, as determined in the balancing clusters of items;

generating a trained model with cluster-level random effects in a generalized linear mix modeling of the dataset using the assigned clusters of items; and providing a recommendation to a user, the recommendation based on the trained model.

18. The method as recited in claim 17, further comprising:

generating an embedding for a new item, the new item not in the trained model;

assigning the new item to an assigned cluster by repeating the balancing clusters with the new item;

applying the cluster level random effects of the trained model for the assigned cluster; and providing the recommendation to a user, the recommendation based on the trained model using cluster level random effects associated with the assigned cluster.

19. The method as recited in claim 18, wherein the recommendation is associated with a recommendation in a professional social network and the two disparate item categories comprise a member category and a job category, and the recommendation provided to a user, is one of a job recommendation, a top similar member recommendation, a top similar job recommendation, or a member recommendation for a job.

20. The method as recited in claim 19, wherein the matrix used in the matrix factorization is customized with correlations among members, jobs, and personalization factors, wherein the personalization factors are specific to the members or jobs.

* * * * *

UNITED STATES PATENT AND TRADEMARK OFFICE
CERTIFICATE OF CORRECTION

PATENT NO. : 10,262,299 B2  
APPLICATION NO. : 15/433741  
DATED : April 16, 2019  
INVENTOR(S) : Li et al.

Page 1 of 1

It is certified that error appears in the above-identified patent and that said Letters Patent is hereby corrected as shown below:

On the Title Page

Item (71), in "Applicant", in Column 1, Lines 1-2, delete "LinkedIn Corporation, Sunnyvale, CA (US)" and insert --Microsoft Technology Licensing, LLC, Redmond, WA (US)-- therefor Item (57), in "Abstract", in Column 2, Line 5, delete "size, items" and insert --size. Items-- therefor In the Claims In Column 24, Line 47, in Claim 1, delete "item;:" and insert --item;-- therefor In Column 25, Line 63, in Claim 9, delete "Item" and insert --item-- therefor In Column 26, Line 25, in Claim 12, delete "social," and insert --social-- therefor Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*